(12) United States Patent
Etherington et al.

(10) Patent No.: US 6,992,478 B2
(45) Date of Patent: Jan. 31, 2006

(54) COMBINATION HALL EFFECT POSITION SENSOR AND SWITCH

(75) Inventors: Kurt Etherington, Edwardsburg, MI (US); Craig Jarrard, Middlebury, IN (US)

(73) Assignee: CTS Corporation, Elkhart, IN (US)

( * ) Notice: Subject to any disclaimer, the term of this patent is extended or adjusted under 35 U.S.C. 154(b) by 6 days.

(21) Appl. No.: 10/743,176

(22) Filed: Dec. 22, 2003

(65) Prior Publication Data

US 2005/0134257 A1    Jun. 23, 2005

(51) Int. Cl.
  *G01B 7/14* (2006.01)
(52) U.S. Cl. .............................. 324/207.2; 324/207.24; 324/207.26
(58) Field of Classification Search ............................... 324/207.11–207.26, 242–244, 247, 249, 324/251, 252, 260, 173–174; 280/735; 123/612, 123/617
See application file for complete search history.

(56) References Cited

U.S. PATENT DOCUMENTS

| | | | |
|---|---|---|---|
| 4,785,242 A | 11/1988 | Vaidya et al. | |
| 5,512,871 A | 4/1996 | Oudet et al. | |
| 5,528,139 A | 6/1996 | Oudet et al. | |
| 5,712,561 A | 1/1998 | McCurley et al. | |
| 5,850,142 A | 12/1998 | Rountos et al. | |
| 5,865,049 A | 2/1999 | Friedrich et al. | |
| 5,955,881 A | 9/1999 | White et al. | |
| 6,018,241 A | 1/2000 | White et al. | |
| 6,057,682 A | 5/2000 | McCurley et al. | |
| 6,106,759 A | 8/2000 | Jarrard | |
| 6,123,892 A | 9/2000 | Jarrard | |
| 6,175,233 B1 | 1/2001 | McCurley et al. | |
| 6,211,668 B1 | 4/2001 | Duesler et al. | |
| 6,222,359 B1 | 4/2001 | Duesler et al. | |
| 6,304,078 B1 | 10/2001 | Jarrard et al. | |
| 6,313,553 B1 | 11/2001 | Gandel et al. | |
| 6,367,337 B1 * | 4/2002 | Schlabach .............. 73/862.331 |
| 6,522,130 B1 | 2/2003 | Lutz | |
| 6,545,462 B2 | 4/2003 | Schott et al. | |
| 6,653,830 B2 * | 11/2003 | Luetzow ................ 324/207.21 |
| 2002/0056625 A1 | 5/2002 | Becker et al. | |

* cited by examiner

*Primary Examiner*—Bot Ledynh
(74) *Attorney, Agent, or Firm*—Mark P. Bourgeois

(57) ABSTRACT

A combination Hall effect position sensor and switch for sensing the position of a moveable object. The sensor has a magnet that is attachable to the moveable object. The magnet has a pair of ends and a central portion. A linear magnetic flux sensor is positioned about the central portion of the magnet. The linear magnetic flux sensor generates an electrical signal indicative of a specific position of the movable object. A switch type magnetic flux sensor is positioned about one of the ends of the magnet. The switch type magnetic flux sensor generates an electrical signal that is indicative of the movable object reaching a pre-determined location.

8 Claims, 9 Drawing Sheets

COMBINATION HALL EFFECT POSITION SENSOR AND SWITCH

BACKGROUND

1. Technical Field

This invention relates, in general, to position sensors. More particularly, this invention relates to a sensor that uses Hall effect devices to generate signals indicating positional information.

2. Background Art

Position sensing is used to electronically monitor the position or movement of a mechanical component. The position sensor produces an electrical signal that varies as the position of the component in question varies. Electrical position sensors are a part of many products. For example, position sensors allow the status of various automotive components to be monitored and controlled electronically.

A position sensor needs to be accurate, in that it must give an appropriate electrical signal based upon the position measured. If inaccurate, a position sensor may hinder the proper evaluation and control of the position of the component being monitored.

Typically it is also described that a position sensor be adequately precise in its measurement. However, the precision needed in measuring a position will obviously vary depending upon the particular circumstances of use. For some purposes only a rough indication of position is necessary; for instance, an indication of whether a valve is mostly open or mostly closed. In other applications more precise indication of position may be needed.

A position sensor should also be sufficiently durable for the environment in which it is placed. For example, a position sensor used on an automotive valve may experience almost constant movement while the automobile is in operation. Such a position sensor should be constructed of mechanical and electrical components to allow the sensor to remain sufficiently accurate and precise during its projected lifetime, despite considerable mechanical vibrations and thermal extremes and gradients.

In the past, position sensors were typically of the "contact" variety. A contacting position sensor requires physical contact to produce the electrical signal. Contacting position sensors typically consist of potentiometers to produce electrical signals that vary as a function of the component's position. Contacting position sensors are generally accurate and precise. Unfortunately, the wear due to contact during movement of contacting position sensors has limited their durability. Also, the friction resulting from the contact can degrade the operation of the component. Further, water intrusion into a potentiometric sensor can disable the sensor.

One important advancement in sensor technology has been the development of non-contacting position sensors. A non-contacting position sensor ("NPS") does not require physical contact between the signal generator and the sensing element. Instead, an NPS utilizes magnets to generate magnetic fields that vary as a function of position, and devices to detect varying magnetic fields to measure the position of the component to be monitored. Often, a Hall effect device is used to produce an electrical signal that is dependent upon the magnitude and polarity of the magnetic flux incident upon the device. The Hall effect device may be physically attached to the component to be monitored and thus moves relative to the stationary magnets as the component moves. Conversely, the Hall effect device may be stationary with the magnets affixed to the component to be monitored. In either case, the position of the component to be monitored can be determined by the electrical signal produced by the Hall effect device.

The use of an NPS presents several distinct advantages over the use of a contacting position sensor. Because an NPS does not require physical contact between the signal generator and the sensing element, there is less physical wear during operation, resulting in greater durability of the sensor. The use of an NPS is also advantageous because the lack of any physical contact between the items being monitored and the sensor itself results in reduced drag.

While the use of an NPS presents several advantages, there are also several disadvantages that must be overcome in order for an NPS to be a satisfactory position sensor for many applications. Magnetic irregularities or imperfections can compromise the precision and accuracy of an NPS. The accuracy and precision of an NPS can also be affected by the numerous mechanical vibrations and perturbations likely be to experienced by the sensor. Because there is no physical contact between the item to be monitored and the sensor, it is possible for them to be knocked out of alignment by such vibrations and perturbations. A misalignment can result in the measured magnetic field at any particular location not being what it would be in the original alignment. Because the measured magnetic field can be different than that when properly aligned the perceived position can be inaccurate. Linearity of magnetic field strength and the resulting signal is also a concern.

In determining the position of the item being monitored, it is useful to know when the sensor has reached or moved to a certain location. Once a given position has been reached, a mechanism can provide feedback indicating that the predetermined position has been achieved. Typically, such a mechanism has taken the form of a separate contact switch. Unfortunately, adding a separate switch complicates the packaging of the position sensor, adds extra cost and increases the overall size of the sensor.

There is a need for a compact, low cost position sensor that is integrated into a single package and provides position and related information.

SUMMARY

It is a feature of the present invention to provide a combination hall effect position sensor and switch.

It is another feature of the present invention to provide a sensor that generates signals for indicating the position of a movable object. The sensor includes a magnet attachable to the moveable object. The magnet has a pair of ends and a central portion. A linear magnetic flux sensor is positioned near the central portion of the magnet and a switch-type magnetic flux sensor is positioned about one of the ends. The linear magnetic flux sensor generates an electrical signal indicative of a specific position of the movable object. Further, the switch-type magnetic flux sensor generates an electrical signal indicative of the movable object reaching a pre-determined position.

It is noted that the drawings of the invention are not to scale.

DETAILED DESCRIPTION

First Embodiment

Figure 1:
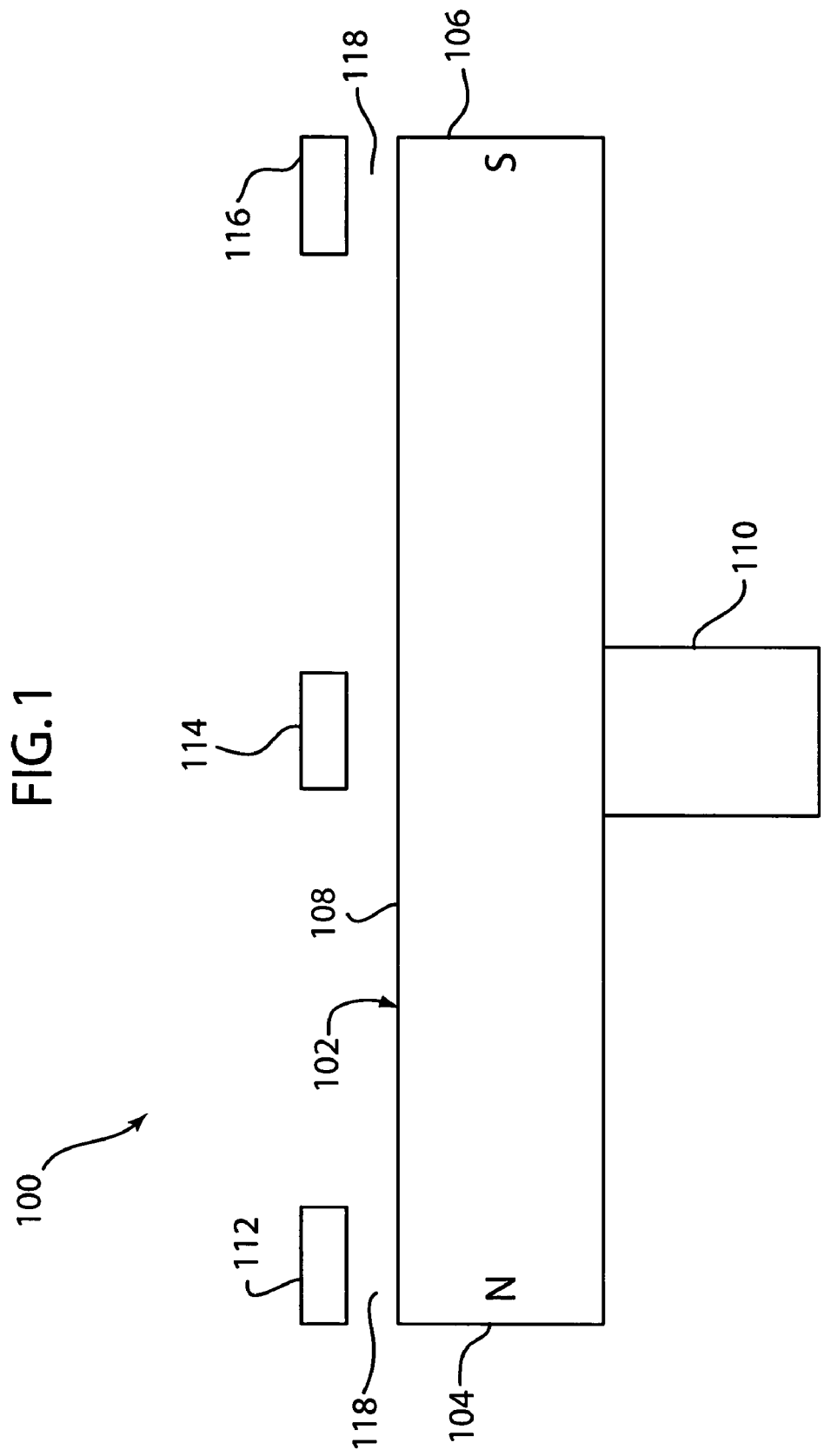
FIG. 1 illustrates a side view of a combination Hall effect position sensor and switch.

Referring to FIG. 1, a combination Hall effect position sensor and switch 100 is shown. Preferably the sensor and switch 100 has a permanent magnet 102 that is polarized such that it has a north end 104, a south end 106 and a central region or portion 108. Permanent magnet 102 can be made from several different ferro-magnetic materials such as, but not limited to, ferrite or samarium cobalt or neodymium-iron-boron. Magnet 102 is attachable in a conventional manner to a movable object or member 110 such as by adhesive or mechanical fastening means. Movable object 110 can be a rotatable shaft, a reciprocating lever, a pedal or other movable member. As such, movable object 110 can be adapted to move either linearly, rotationally, or along an arcuate planar path. Sensor and switch 100 are configured to work with the linear, rotational or arcuate motion of the moveable object 110.

A switch type magnetic flux sensor, such as a conventional switch-type Hall effect device 112 is positioned adjacent or near the magnet north end 104. Another conventional switch-type magnetic flux sensor, such as a switch-type Hall effect device 116 is positioned adjacent or near the magnet south end 106. Switch-type Hall effect devices 112 and 116 are commercially available as model HAL1000 from Micronas company of Zurich, Switzerland. Switch-type Hall effect devices 112 and 116 produce a step output once the gauss level exceeds a certain level. For example, if the magnetic flux level sensed exceeds 300 gauss or 30 millitesla (mT), Hall effect devices 112 and 116 will switch output from 0 volts to 5 volts. Accordingly, when Hall effect device 112 or 116 is located about magnet 102 as shown in FIG. 1, the Hall effect devices will be turned on and have an output of 5 volts. However, if movable member 110 moves such as to also move magnet 102 to the right Hall effect device 112 will no longer be about the north end 104, and thus the output of Hall effect device 112 switches to 0 volts. Similarly, if movable object 110 moves to the left such that Hall effect device 116 is no longer about the south end 106 of magnet 102, then the output of Hall effect device 116 switches to 0 volts.

A ratiometric or linear output type magnetic flux sensor, such as a linear type Hall effect device 114 is positioned adjacent or near the magnet central portion 108. Hall effect devices 112, 114 and 116 are separated from magnet 102 by a gap or open space 118.

Linear type Hall effect device 114 is commercially available as model HAL815 from Micronas company of Zurich, Switzerland. Linear type Hall effect device 114 produces a linearly changing output voltage depending upon the polarity of the magnetic field sensed. For example, when the polarity changes from North through the zero point to South, Hall effect device 114 will output a voltage that varies linearly from 0.50 volts to 4.50 volts.

Figure 2:
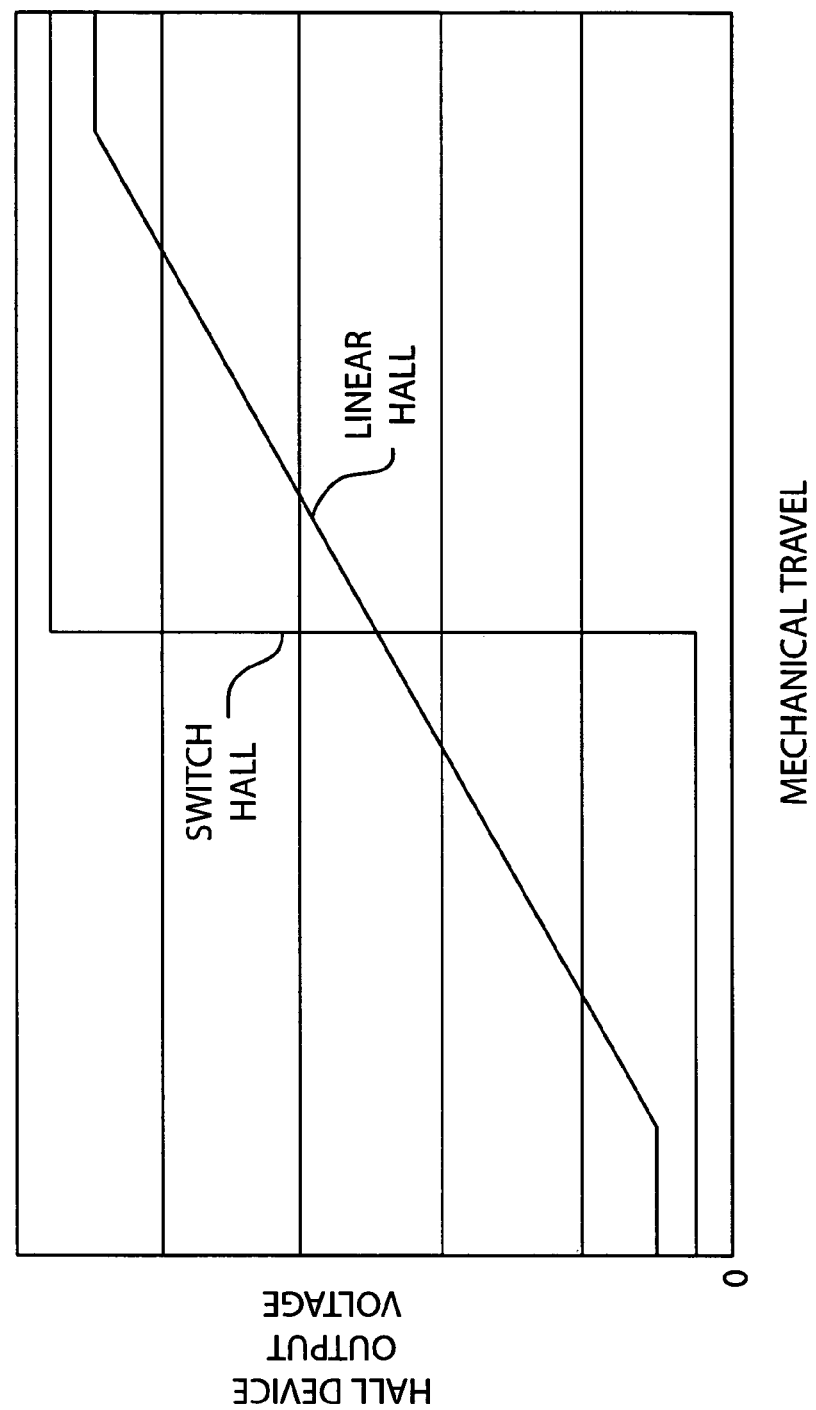
FIG. 2 illustrates a graph of mechanical position versus output signals for the sensor and switch of FIG. 1.

FIG. 2 shows a graph of mechanical position versus the output signals for the sensor and switch of FIG. 1. As stated previously, the electrical output signal of switch Hall effect devices 112 and 114 changes in a step function. Moreover, the electrical output signal of linear Hall effect device 114 changes linearly.

Preferred Embodiment

Figure 3:
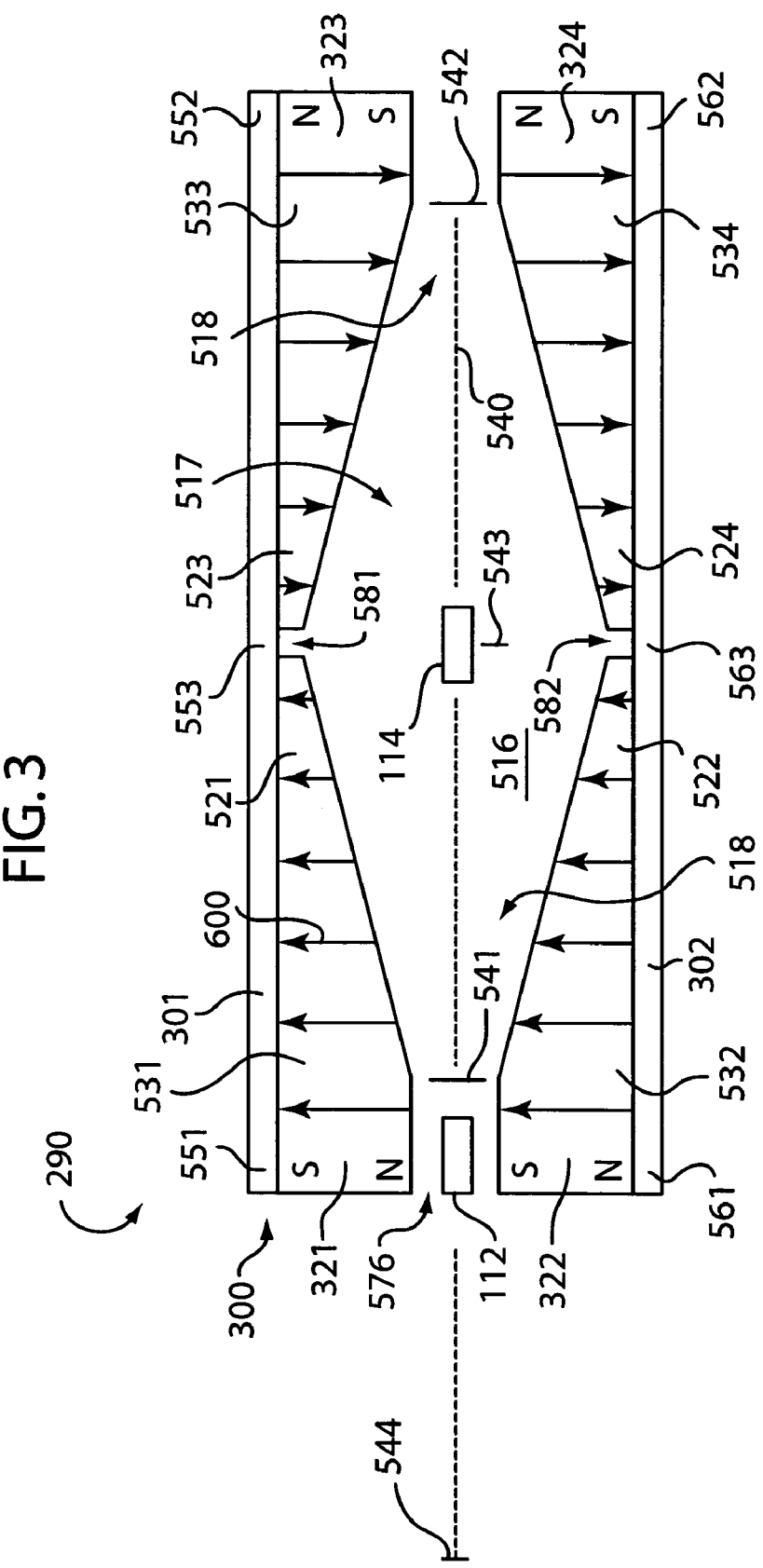
FIG. 3 illustrates a side view of the preferred embodiment of a combination Hall effect position sensor and switch.

FIG. 3 illustrates a side view of the second or preferred embodiment of a combination Hall effect position sensor and switch 290. Sensor and switch 290 has a magnet assembly 300 with a pair of pole pieces or plates including a first plate 301 and second plate 302. The first plate 301 has a first end 551, a second end 552, and a middle 553. The second plate 302 likewise has a first end 561, a second end 562, and a middle 563. It is to be appreciated that the first plate 301 and second plate 302 may be of any shape, and the reference to "ends" is used for purpose of demonstration, not to limit the scope of configurations possible within the scope of the present invention.

The first magnet region 321 has a thin end 521 and an opposite thick end 531 with a tapered portion therebetween. The first magnet region 321 is affixed to the first plate 301 such that the thin end 521 is proximate to the middle 553 of the first plate 301, while the thick end 531 is proximate to the first end 551 of the first plate 301. The first magnet 321 produces a varying magnetic flux field from the thin end to the thick end, as indicated by vectors 600 in FIG. 3. The polarity of the magnetic field generated by the first magnet region 321 is indicated by the upward direction of the vectors 600. The polarity of the magnetic field generated by the first magnet 321 is denoted the first polarity and defined as positive. Likewise, the strength of the magnetic flux field is indicated by the length of the vectors. As can be seen in FIG. 3, the magnetic flux field generated by the first magnet 321 decreases in strength from the thick end 531 to the thin end 521. Like magnet 321, magnets 322, 323 and 324 are similarly designed as illustrated. As recognized by those having skill in the art, the third magnet region 323 and the first magnet region 321 are described as linearly or symmetrically adjacent, or simply adjacent. Likewise, the second magnet region 322 and the fourth magnet region 324 are described as linearly or symmetrically adjacent, or simply adjacent.

The four tapered magnets 321, 322, 323, and 324 can be formed of bonded ferrite or other magnetic materials. A first gap 581 is shown separating the thin end 521 of the first magnet 321 from the thin end 523 of the third magnet 323. A second gap 582 separates the thin end 522 of the second magnet 322 from the thin end 524 of the fourth magnet 324. While the gaps 581 and 582 can be omitted without departing from the scope of the present invention, they serve important functions. In particular, the gaps 581 and 582 increase the consistency of the linearity of the magnetic field within the space or void 516 between the magnets attached to plates 301 and 302. As a practical matter, the thin end of a magnet will always have a finite thickness and generate a non-zero magnetic field. If the thin ends of two magnets having opposite polarities are immediately adjacent, there will be a discontinuity of the combined magnetic field about the symmetry point 543. Gaps 581 and 582 allow for a consistent neutral zone, at around point 543 independent of magnetizing property variations, which aids linearity of sensor output. The gaps 581 and 582 can be created during the molding of the magnets. If the magnets are formed individually, the gaps 581 and 582 may be formed by appropriately positioning the individual magnets. Alternatively, magnetic material may be removed to create the gaps after the magnets have been formed.

The air gap 516 is formed between the magnet regions 321, 322, 323 and 324. Preferably, the air gap or space or void 516 between the magnets 321, 322, 323 and 324 is essentially diamond shaped, with the central portion of the air gap 517 being larger than both ends 518 of the air gap 516. A linear magnetic flux sensor such as a Hall effect device 114 is positioned within the air gap or void 516. A switch Hall effect device 112 is also located in air gap 576 between magnet regions 321 and 322. The relative lateral movement between the Hall effect device 114 and the magnets causes the position of the Hall effect device 114 within the air gap 516 to vary along plane or line 540. The magnetic field within the air gap 516 is the sum of the magnetic fields generated by the first magnet 321, the second magnet region 322, the third magnet 323 and the fourth magnet region 324.

The polarity and strength of the combined magnetic field varies along the axis or line 540. One end of line 540 is at about position 541 and the other end is at about position 542. The magnetic field generated by the first magnet 321 and the second magnet 322 is defined as positive. The magnetic field generated by the third magnet 323 and the fourth magnet is defined as negative.

Magnet assembly 300 can be attached to a movable object that rotates or moves linearly. Magnet assembly 300 can move to the left or right of the position shown. The magnetic field detected by the Hall effect device 114 as it moves along the line 540 will be large and positive at the first end 541 of the air gap and decrease substantially linearly as it approaches the middle 543 of the air gap, at which point the magnetic field will be substantially zero. Magnet assembly 300 is preferably designed and constrained so as to not to move to the left.

Switch Hall effect device 112 is located at position 541 to start. Hall effect device 112 travels along the line 540 between position 543 and position 544. At about position 541, switch Hall effect device 112 will be in the presence of a flux field that is strong enough to keep it switched on. As the magnets move to the right and Hall effect device 112 relatively goes to position 544, the strength of the flux field rapidly falls off with distance from ends 531 and 532 of the magnet. This flux change is sensed by Hall device 112 and causes device 112 to switch output from a high state of 5 volts to a low state of 0 volts output.

Hall devices 112 and 114 would be connected to additional signal conditioning circuitry (not shown) that would amplify and condition the electrical signals. It is noted that the switch Hall effect device 112 could be configured to switch from 0 volts at position 541 to 5 volts at position 544 if desired by modifying the signal conditioning circuitry.

Magnet assembly 300 is preferably designed and constrained so as to not move to the left. This avoids any possible problems with Hall effect switch 112 switching in a region of low magnetic flux such as at position 543.

Figure 4:
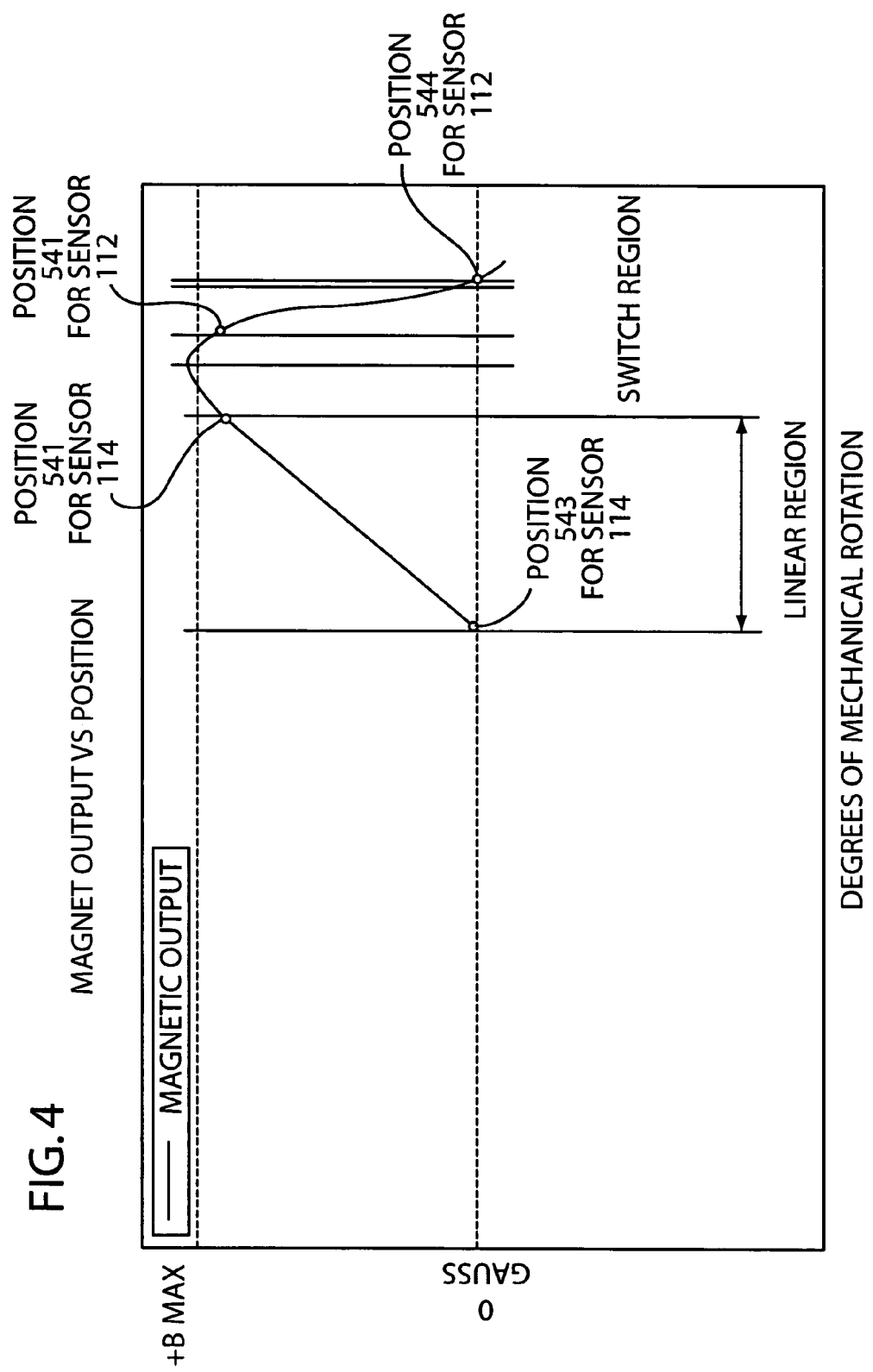
FIG. 4 illustrates a graph of mechanical position versus magnetic flux density for the magnet of FIG. 3.

FIG. 4 illustrates a graph of mechanical position versus magnetic flux density for magnet assembly 300. In FIG. 4, the x-axis denotes the position of the Hall effect devices 112 and 114 along line 540 and the y-axis illustrates the magnetic flux density detected. As can be seen, the magnetic flux density measured by the Hall effect device 114 at position 543 is low and goes to high at position 541. The flux measured by Hall device 114 has a low gradient or rate of change. The measured magnetic flux density is substantially linear between position 541 and position 543, with the point of substantially zero magnetic flux density being located at position 543. The magnetic flux density measured by the Hall effect device 112 at position 541 is high and rapidly falls to zero at position 544. The magnetic flux measured by Hall device 112 has a high gradient or rate of change, resulting in low variability in the switch point position.

Third Embodiment

Figure 5:
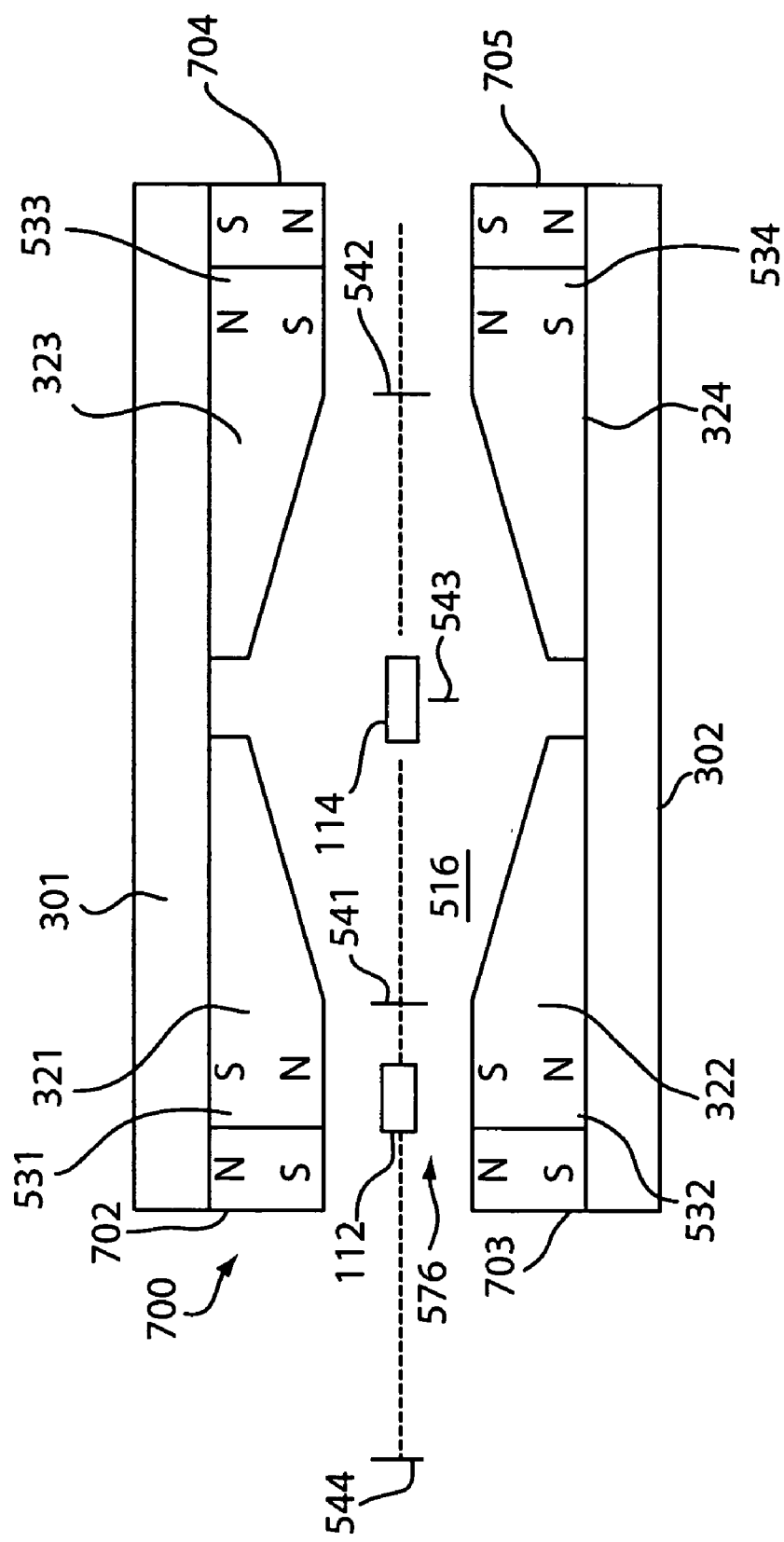
FIG. 5 illustrates an alternative magnet design for the sensor and switch of FIG. 3.

FIG. 5 illustrates a third embodiment that uses an alternative magnet assembly design. Magnet assembly 700 is similar to magnet assembly 300 except that additional field shaping magnets 702, 703, 704 and 705 have been added. Magnet 702 adjoins end 531 of magnet 321. Magnet 703 adjoins the end 532 of magnet region 322. Magnet 704 is adjoins end 533 of magnet 323. Magnet 705 adjoins the end 534 of magnet 324. Field shaping magnets 702, 703, 704 and 705 are polarized opposite to the polarization of magnets 321, 322, 323 and 324. Compared to the magnet assembly 300 of FIG. 3, field shaping magnets 702, 703, 704 and 705 cause the magnetic flux field detected by switch Hall effect device 112 to have a larger gradient with a change in position or to change more quickly as magnet assembly 700 is moved. This allows for more precise switch positions for switch Hall device 112.

Figure 6:
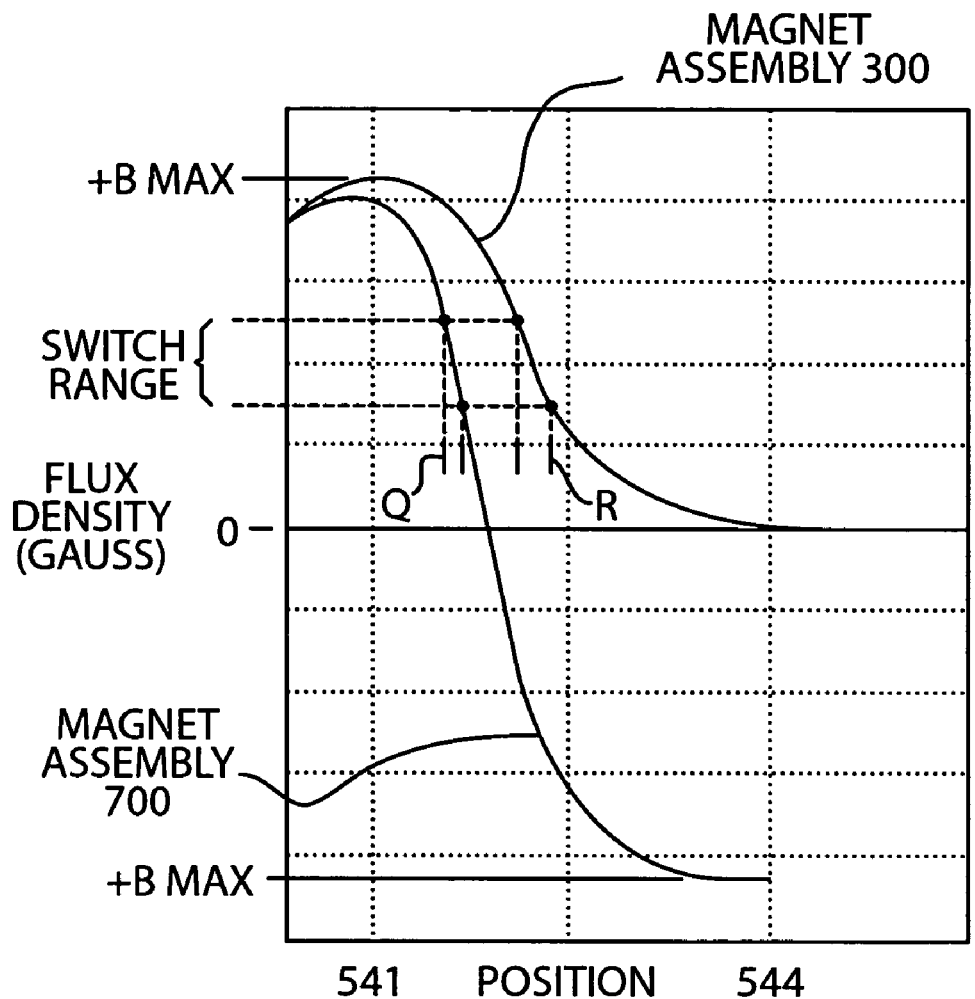
FIG. 6 illustrates a graph of mechanical position versus magnetic flux density for the magnet of FIG. 5.

FIG. 6 shows a graph of mechanical position versus magnetic flux density for magnet assembly 700 and 300 as they move from position 541 to 544. As can be seen in FIG. 6, the flux density for magnet assembly 700 changes more steeply than for magnet assembly 300. The position switching range for magnet assembly 700 is designated as Q. 300. The position switching range for magnet assembly 300 is designated as R. The position range R is larger than position range Q. In other words, with nominal tolerances in the switch point of the Hall effect device, magnet assembly 300 will display more variation in switch position than will magnet assembly 700. The higher flux gradient is due to the pole reversal created by magnets 702 and 703.

Clutch Position Sensor and Switch

Figure 7:
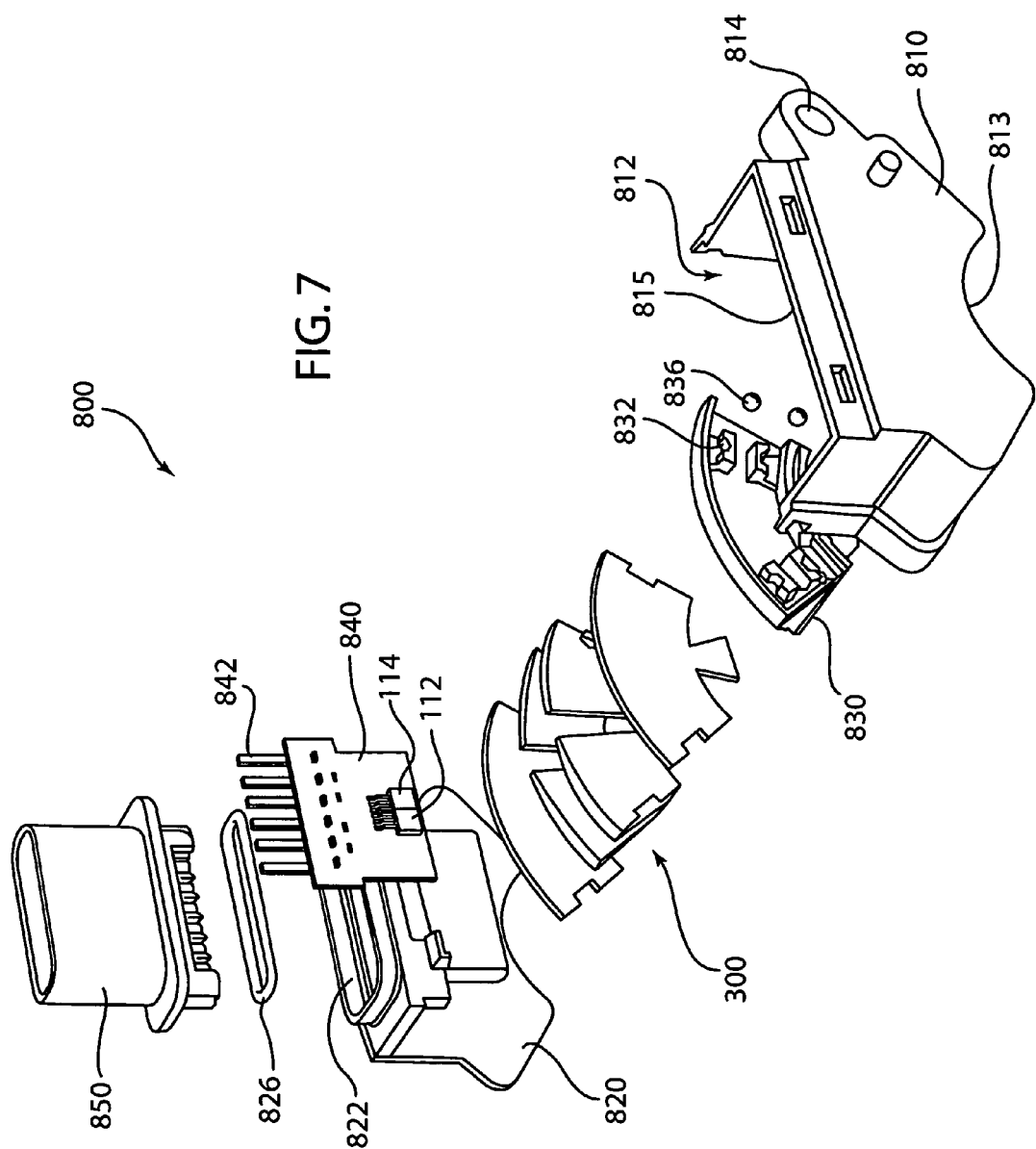
FIG. 7 illustrates an exploded view of the combination Hall effect position sensor and switch of FIG. 3 packaged in a housing.
Figure 8:
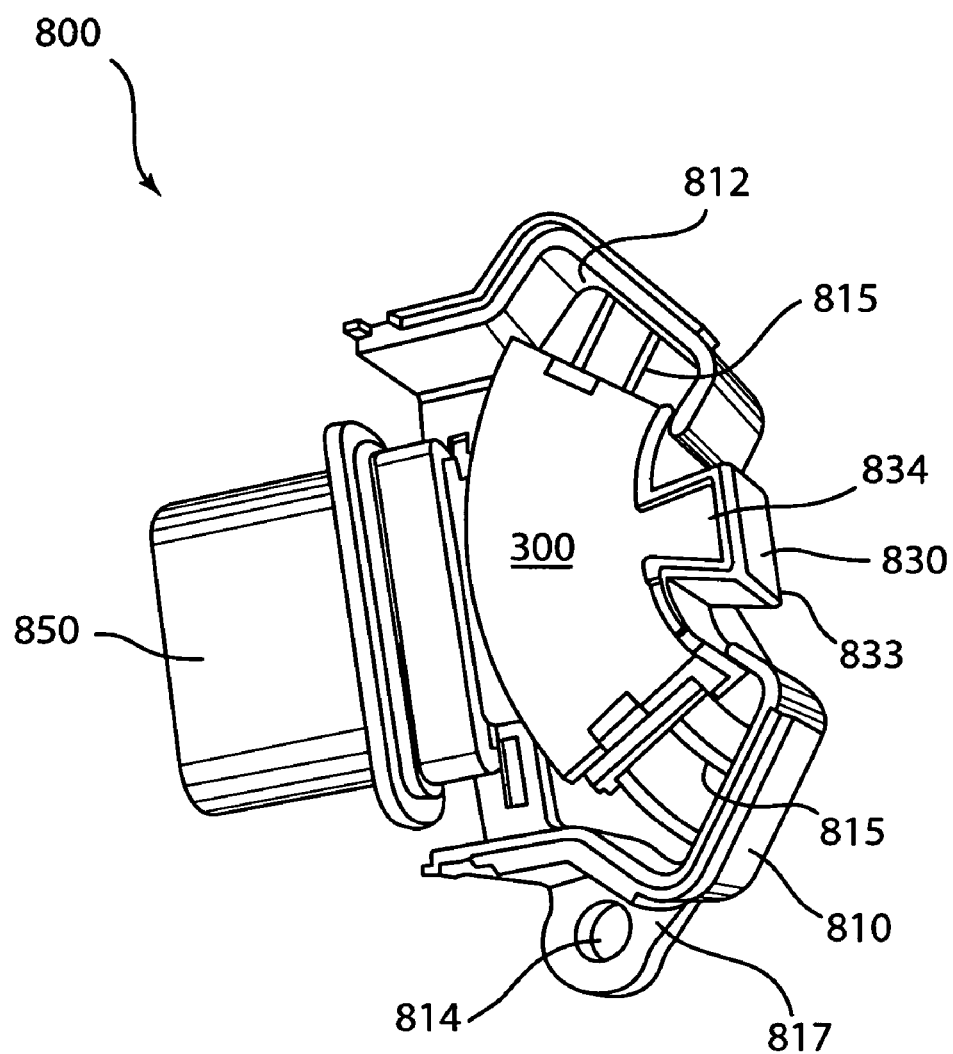
FIG. 8 illustrates a perspective assembled view of FIG. 7.
Figure 9:
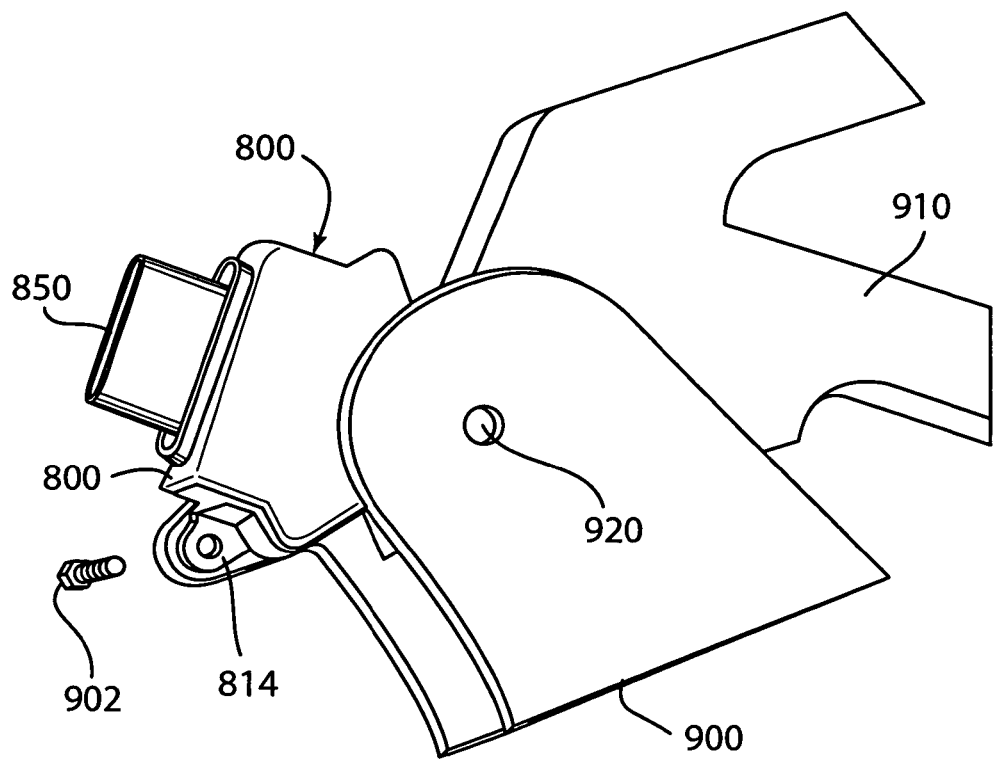
FIG. 9 illustrates a perspective view of the assembled sensor and switch of FIG. 8 mounted to a clutch pedal.

In accordance with the present invention, a non-contacting clutch position sensor and switch 800 is shown in FIGS. 7, 8 and 9. Clutch position sensor and switch 800 includes a housing 810, cover 820, magnet holder 830, magnet assembly 300, circuit board 840, connector shroud 850, clutch bracket 900 and clutch pedal 910. Housing 810 has a cavity 812, a pedal opening 813, a mounting hole 814 and bearing races 815. Housing 810 can be injected molded plastic.

Magnet holder 830 has bearing holders 832, dovetail portion 833 and magnet cavity 834. Magnet assembly 300 fits into and is retained by magnet cavity 834. Magnet holder 830 can be injected molded plastic. Ball bearings 836 are located between bearing holder 832 and bearing races 815. Magnet holder 830 moves in housing 810 along bearing races 815. Printed circuit board 840 holds switch Hall effect device 112 and linear Hall effect device 114. The Hall effect devices have leads that are soldered to the printed circuit board. The printed circuit board holds the Hall effect devices in air gaps 516 and 576. The printed circuit board has terminals 842 that extend into connector shroud 850. Circuit board 840 is press fit into connector shroud 850. Printed circuit board 840 can also have signal amplification and conditioning circuitry mounted on it.

Cover 820 has an aperture 822 through which the printed circuit board passes. Seal 826 makes a seal between connector shroud 850 and cover 820. Cover 820 is heat staked to housing 810. Clutch pedal arm 910 extends through housing opening 813 and is mounted to magnet holder 830. Dovetail portion 833 fits into a corresponding dovetail receptacle (not shown) on pedal arm 910 in order to retain magnet holder 830 to pedal arm 910. Clutch sensor 800 is mounted to clutch bracket 900 by bolt 902 through mounting hole 814. A rod 920 extends through pedal arm 910 and bracket 900. Rod 920 rotatably supports pedal arm 910.

When clutch pedal arm 910 is depressed by a vehicle operator, magnet holder 830 and magnet assembly 300 moves with respect to printed circuit board 840. With Hall devices 112 and 114 fixed in place, their respective electrical output signals change in response to the position of pedal arm 910. As the magnetic field generated by the magnets 300 and detected by the Hall effect device 114 varies with rotation, the signal produced by the Hall effect device 114 changes accordingly, allowing the position of the pedal arm to be ascertained.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A sensor for sensing position of a moveable object, comprising:
   a magnet attachable to the object, the magnet having a pair of ends and a central portion, the magnet generating a slowly changing flux field near the central portion and a rapidly changing flux field at the ends;
   a first magnetic flux sensor positioned about the central portion of the magnet, the first magnetic flux sensor generating an electrical signal indicative of a specific position of the movable object; and
   a second magnetic flux sensor positioned about the first end of the magnet, the second magnetic flux sensor generating an electrical signal indicative of when the movable object has reached a pre-determined location.

2. The sensor according to claim 1 wherein, the first and second magnetic flux sensors are hall effect devices.

3. A sensor for sensing movement of a movable object, comprising:
   a) at least one magnet attachable to the movable object, the magnet having a first end, a second end and a central portion;
   b) the first and second ends of the magnet having a first flux density that changes about the ends;
   c) the central portion of the magnet having a second flux density that changes more slowly about the central portion than about the ends of the magnet;
   d) a first magnetic flux sensor positioned about the central portion of the magnet, the first magnetic flux sensor generating a first electrical signal indicative of a specific position of the movable object; and
   e) a second magnetic flux sensor positioned about the first end of the magnet, the second magnetic flux sensor generating a second electrical signal indicative of the movable object reaching a pre-determined location.

4. The sensor according to claim 3 wherein, the second magnetic flux sensor functions as a first switch.

5. The sensor according to claim 3 wherein, a third magnetic flux sensor is positioned about the second end.

6. The sensor according to claim 5 wherein, the third magnetic flux sensor functions as a second switch.

7. The sensor according to claim 3 wherein, the first electrical signal is linear.

8. The sensor according to claim 3 wherein, the second electrical signal is step shaped.

* * * * *